FIG.1.

Oct. 17, 1944.   C. H. SCOTT   2,360,817
SEDIMENTATION APPARATUS
Filed March 19, 1943   7 Sheets-Sheet 4

INVENTOR.
CHARLES H. SCOTT,
BY
ATTORNEY

Oct. 17, 1944.  C. H. SCOTT  2,360,817
SEDIMENTATION APPARATUS
Filed March 19, 1943  7 Sheets-Sheet 5

INVENTOR.
CHARLES H. SCOTT,
BY
ATTORNEY

Oct. 17, 1944.    C. H. SCOTT    2,360,817
SEDIMENTATION APPARATUS
Filed March 19, 1943    7 Sheets-Sheet 6

INVENTOR
CHARLES H. SCOTT,
BY
Arthur Middleton
ATTORNEY

FIG.13.

Patented Oct. 17, 1944

2,360,817

UNITED STATES PATENT OFFICE 2,360,817

SEDIMENTATION APPARATUS

Charles H. Scott, Summit, N. J., assignor to The Dorr Company, New York, N. Y., a corporation of Delaware Application March 19, 1943, Serial No. 479,729

13 Claims. (Cl. 210—55)

This invention relates to sedimentation apparatus for treating in a continuously operating manner liquids having solids in suspension, to effect separation of the mixture while in transit through a settling tank into clarified liquid and solids that settle in the form of sludge. The operation is continuous as clarified liquid leaves the settling tank by way of overflow, while the sludge is continuously conveyed over the tank bottom to an outlet point from which it is withdrawn.

More in particular, this invention relates to improvements in sludge collecting and conveying mechanism having sludge raking arms rotating about a vertical axis and effective to impel the sludge over the tank bottom to a point of withdrawal. A rotary raking assembly means may comprise a vertical rotary member or shaft carrying the rake arms, and a main drive gear concentric with the shaft and having rotation transmitting connection therewith. A motor-driven worm or other suitable mechanism or drive unit may furnish the driving torque to the main drive gear.

A problem in the operation of apparatus of this type is due to the fact that the rotary raking mechanism may become unduly overloaded due to excessive accumulation of settled sludge. Hence, mechanism has been employed to enable the raking arms to be lifted. Provision has been made for the vertical rotary member or shaft to be axially shiftable relative to the main drive gear, so that by shifting the shaft upwardly the rake arms could be lifted bodily out of or away from the accumulation of settled sludge. Such axial movement of the shaft has been effected with the aid of a threaded portion at the upper end of the shaft and coaxial and unitary therewith, and an operating nut engaging upon the threaded portion, and the rotation of which would lift or lower the raking means.

A more specific problem is to operate the rake-lifting means while the rake arms are rotating under load, and for instance when a degree of overload may be registered as by an overload-indicating device the function of which will be described more fully below. In other words, this contemplates the situation where it is desired to lift the raking means without otherwise interrupting the operation, when a degree of overload has been indicated.

Still another object is to provide suitable rake lifting means, or remote-controlled rake lifting means adaptable to existing installations or designs without considerable change, and for the conversion of designs or installation of sedimentation apparatus not now provided with rake lifting means.

One object of this invention is to provide improved mechanism for lifting the raking means while under load, that are especially efficient mechanically, whereby a minimum of strain and wear and tear are imposed upon the operating parts while lifting under load.

Another object is to provide rake lifting mechanism that is power saving, inasmuch as a balanced or substantially true torque continues to be transmitted to the vertical member or shaft even though under load, and in spite of possible manufacturing inaccuracies in the torque transmitting elements.

Another object is to provide lifting mechanism for the raking means, that can be actuated at will by electrical remote control, for instance in response to overload indications obtainable as by remote electrical indication.

Some of these objects are attained by providing floating-type compensating or coupling means as a part of the torque transmitting elements to effect balanced or true torque transmission from the main drive gear to the axially movable member or shaft.

The object of providing remote control to be exercised at will is attained by providing drive means which include an auxiliary motor, all mounted upon and movable bodily with the main drive gear that rotates the vertical shaft and the rake arms. Inasmuch as this assembly as a whole rotates, stationary sliding contacts are provided therefor to supply power to auxiliary motor.

According to one feature, the main drive gear is provided with an upwardly extending hollow portion which surrounds the upper end portion of the vertical shaft, and which provides vertical track means to guide the up-and-down movement of the shaft while transmitting the driving torque thereto. This upwardly extending hollow portion of the main driving gear may be said to represent a hollow hub extension thereof, which may herein be termed the torque tube, since it has a pair of opposedly arranged vertical guide tracks for transmitting the driving torque from the main drive gear to the shaft by means of a torque balancing or torque equalizing compensating member or ring which is functionally interposed between the guide tracks and the shaft, and which compensating member moves bodily up-and-down with the shaft. A pair of opposed portions of the compensating ring or member have torque transmitting force engagement with the correspondingly disposed vertical guide tracks, and that the ring furthermore has a limited play permitting it to float with respect to the shaft in a horizontal direction and at right angles to the tracks, to insure by virtue of such floating movement the transmission of a substantially balanced or true torque from the main driving gear to the shaft.

According to a more specific feature the driving torque is transmitted from the torque tube to the compensating ring and thereby to the shaft by way of a pair of anti-friction rollers carried by the compensating ring and operating on the vertical guide tracks.

According to another feature, power actuated means are provided for raising or lowering the shaft that carries the sludge raking arms, which means comprise an auxiliary motor supported by and unitary with the torque tube. While this auxiliary motor may be operated at will, this arrangement more specifically lends itself to operative coordination with overload indicating or registering devices.

One type of overload responsive means is based upon the principle of the sliding worm, that is a torque transmitting drive worm subject to axial displacement in proportion to the driving torque reaction thereon. Overload indications may be derived directly by mechanical means from such displacement, or a predetermined amount of displacement may be converted by electrical relay into some other form of indication or warning or else indications of loads or overloads manifesting themselves by various degrees of axial displacement of the driving worm may be currently transmitted by a suitable electrical system to an indicating or registering instrument such as a Bristol recording gauge which may be located at a remote station. In response to such remote indications an operator from the same remote station may start the auxiliary motor, causing an upward movement of the shaft until automatically stopped by suitable limit switch arrangement.

According to another feature, there is provided a substantially self-contained assembly unit or attachment comprising the aforementioned torque tube whereby the unit is attachable to the main drive gear of an existing installation or design of settling apparatus which can thus be converted into one with rake lifting mechanism adapted for direct manual- or for power actuated or remote control.

Still another feature lies in the construction of certain limit switch devices and their actuating means, for the control of the auxiliary motor.

According to a preferred embodiment, a self-contained assembly unit comprising the aforementioned torque tube is attached as by flange connection to the main drive gear. The torque tube thus represents an adapter element, making possible the attachment of the unit to and its incorporation in sedimentation apparatus of the general type herein considered. The torque tube carries the auxiliary motor together with gearing for actually moving the vertical shaft, the shaft being provided at its upper end portion with a vertical member or screw spindle portion forming an upward extension of the shaft, whereby the shaft can be lifted or lowered when the auxiliary motor operates. The upper end portion of the shaft is furthermore provided with torque transmitting means engaging vertical guide tracks on the torque tube, whereby the driving torque from the main driving gear is transmitted to the shaft by virtue of the compensating member or ring operatively interposed between the shaft and the guide tracks, whereby a substantially balanced or true torque is transmitted.

The assembly unit or attachment also has unitary therewith limit switch means that are controlled by the bodily up-and-down movement of the compensating member, so as to stop the motor and the shaft at the upper or lower end of its axial movement.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which

Figure 1:
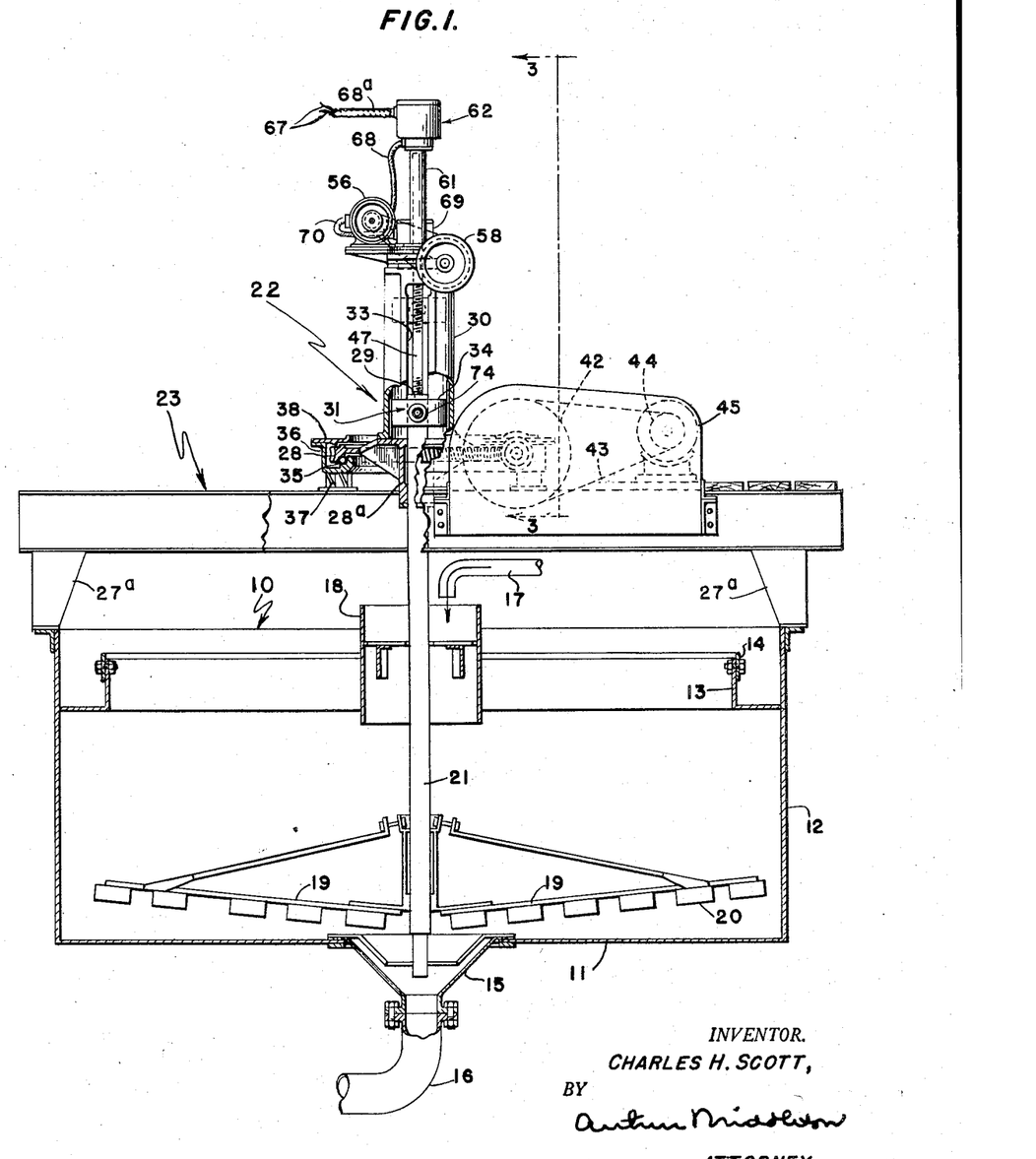
Figure 1 presents a general view by way of an elevational section of a sedimentation apparatus having rotary sludge raking means, which apparatus is provided with the novel lifting mechanism for the raking means.

The sedimentation apparatus embodying this invention comprises, according to Fig. 1, a settling tank 10 having a bottom 11, and an upstanding wall 12, a marginal circular launder 13 with an adjustable weir portion 14 to receive clarified overflow liquid, a sludge outlet means comprising a conically shaped sump portion 15 leading into and connected with a sludge withdrawal pipe 16. A supply of feed liquid is indicated by a feed pipe 17 discharging into a cylindrical feed receiving well 18.

Mechanism to convey settled solids or sludge over the tank bottom to the central point of discharge or sump 15 comprises familiar rotary rake arms 19 provided with sludge engaging or plowing blades 20. The arms 19 are fastened to a vertical rotary member or shaft 21 which is shown to be supported and rotated by a portion of a drive mechanism collectively designated by the numeral 22, and which embodies such improvements, according to this invention, as the improved torque transmitting- and lifting mechanism for the sediment raking means.

The drive mechanism 22 in turn is supported and fastened upon a super-structure 23 spanning the tank, and comprising mainly a pair of beams 24 and 25 and diagonals 27. Brackets 27ª are shown to support the beams 24 and 25 upon the top end portion of the tank wall. The drive mechanism comprises a large or main drive gear in the form of a worm gear 28 having a downwardly extending hub portion 28ª in which the shaft 21 is axially slidable. A torque transmitting connection is not provided between this hub portion 28ª and the shaft 21, but between the upper-end portion 29 of the shaft and a torque tube 30 which is fastened to and unitary with the worm gear 28 and extends upwardly therefrom. The driving torque is transmitted from the gear 28 to the shaft 21 by means of interposed special and novel coupling means collectively designated in Fig. 1 by numeral 31, which torque transmitting coupling means are bodily movable up or down with the shaft 21 while maintaining torque transmitting engagement with vertical guide tracks furnished by a pair of oppositely arranged vertical slots 32 and 33 (see also Figs. 3, 4, 8, 9) provided on the torque tube 30.

The torque transmitting coupling means 31 comprise a novel compensating member or ring 34 (more clearly shown in Figs. 3, 4, 8, 9, 10, 11) the details and function of which will be described further below.

The main driving gear or large worm gear 28 rotates upon an annular vertical thrust bearing 35 shown to comprise anti-friction balls. The stationary part or base of the bearing is represented by a roughly annular shaped casing 36 having integral therewith pads or footings 37 whereby it is mounted upon the beams 24 and 25 of the superstructure, and a cover portion 38.

Figure 2:
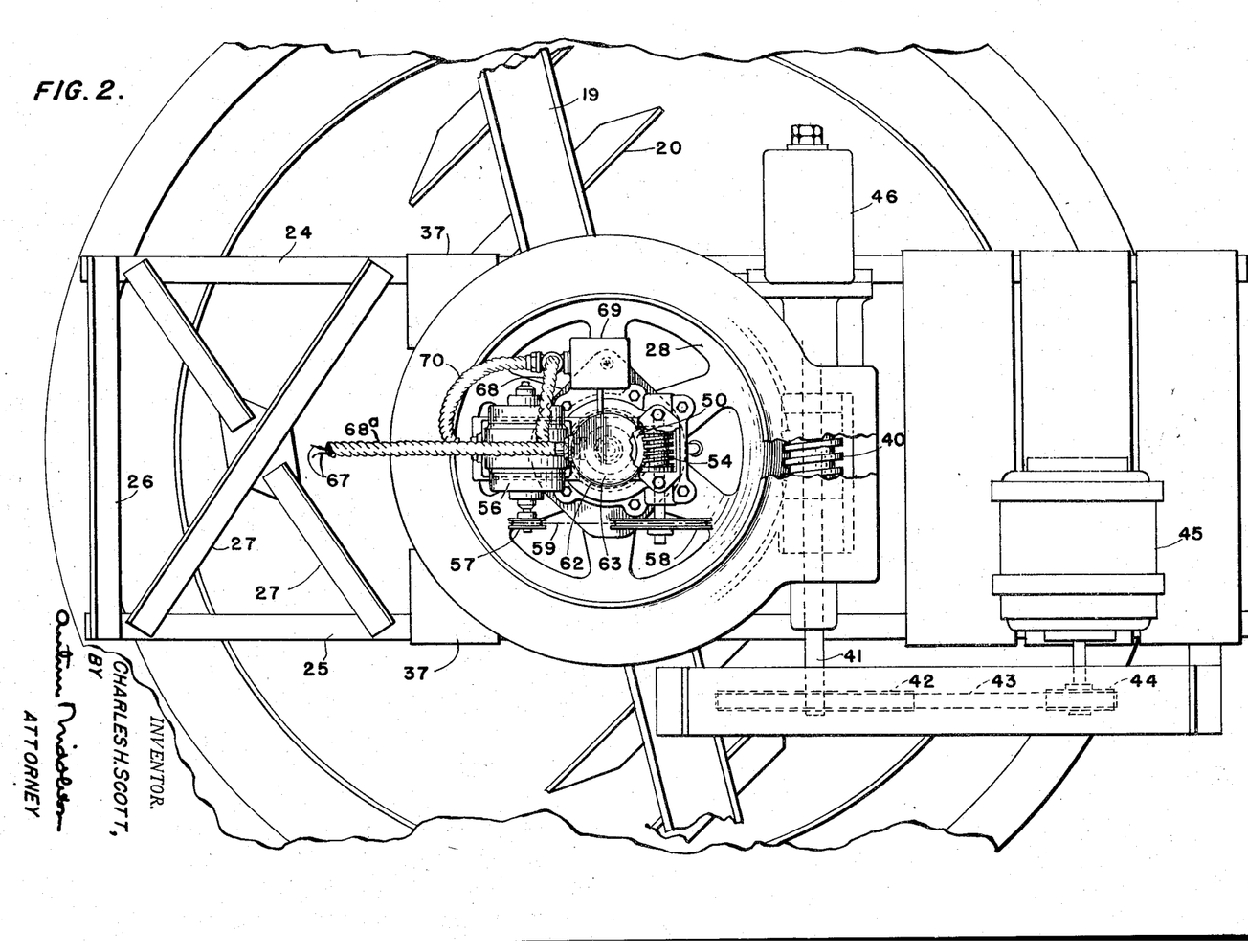
Fig. 2 is a plan view somewhat enlarged of the apparatus shown in Fig. 1 with certain cover parts broken away to show parts of the main drive and of the auxiliary drive respectively.

The worm gear 28 is driven by a worm 40 on a worm shaft 41 (see Fig. 2) driven through pulley 42, belt 43 and pulley 44 from a drive motor 45 which is separately mounted on the superstructure 23 as shown in Fig. 2.

The main driving worm 40 may be provided with a device that is responsive to the axial thrust reaction of the worm under load, and such a device diagrammatically indicated by the box 46 at the free end of the worm shaft may serve to produce indications of the load, or to transmit such indication to a remote control station. An example of the construction and application of such a thrust-responsive device 46 associated with an axially slidable worm is shown for instance in U. S. Patent to Lund No. 1,931,232, issued October 17, 1933, or the Patent to Scott No. 2,291,836, of August 4, 1942.

Constituting an upward coaxial extension of the shaft 21, a threaded rod or stem or spindle portion 47 is screwed into the top end of the shaft and secured thereto by lock nut 48. A rotatable actuating nut 49 which is unitary with an auxiliary worm gear 50 supports the threaded stem 47 and thereby the weight of the vertical shaft 21 and of the rake arms 19. The auxiliary worm gear 50 in turn has an annular vertical thrust bearing 51 upon a bearing plate 52 which is mounted upon and constitutes the top portion whereby the upper end of the body portion or torque tube 30 is closed. The bearing plate 52 also constitutes the lower half of an auxiliary gear casing 53 which houses the auxiliary worm gear 50 and its driving worm 54. The top half or upper portion of the auxiliary gear casing designated by the numeral 55 also serves as a mounting base for an auxiliary motor 56 driving the auxiliary worm 54 by pulleys 57 and 58 and an endless driving element indicated at 59. In will be seen that the auxiliary motor 56 is mounted upon a platform or bracket portion 60 extending from the upper auxiliary gear casing portion 55.

A vertical tubular casing portion 61 is fastened as at 61ª to the top portion 55 of the auxiliary gear casing 53, and extends upwardly to accommodate the rising portion of the threaded stem 47 when the shaft 21 and the rake arms 19 are lifted by rotating the operating nut 49 when driven by the worm gear 50 and worm 54 from the auxiliary motor 56. At the top end of the tubular casing portion 61 is disposed a stationary casing or box 62 having a cover 63, which surrounds contact means supplying electric power from a stationary source to the auxiliary motor 56. It will be noted that the torque tube 30 and the motor 56 supported by it revolve bodily about the vertical axis of shaft 21, since they are unitary with the rotating main drive gear or worm 28. Consequently, the power contact means in the box 62 comprise three rotary contact rings 64, 65, 66 for power supply, which rings are unitary and rotate together with the main drive gear 28, and corresponding contact brushes connected with the stationary box 62. Only two brushes 64ª and 65ª are visible in Fig. 4. The power source is indicated by cable 67 in stationary tube 68ª fixed to box 62. Power cable 68 is shown to lead from the box 62 to a control switch box 69 having a cover 69ª and from there as at 70 to the motor 56. The operation of the electrical part will be explained further below by reference to the wiring diagram in Fig. 13.

The aforementioned torque transmitting means (see Fig. 1) comprise parts more clearly shown in Figs. 3, 4, 8, 10, 12, namely, a collar 71 fixed to the top end portion of shaft 21 as by key connection 72, and the torque transmitting coupling member or compensating ring 34 surrounding the collar 71, and capable of limited horizontal movement in only one direction with respect to the collar 71. Referring more specifically to Figs. 8, 10, 11, 12, the compensating member or ring 34 consists of a roughly annular body portion 34ª carrying at each side an anti-friction roller 73 and 74 respectively lodging in the vertical slots 32 and 33 respectively of the torque tube 30, the interior vertical faces or sides of which slots represent vertical guide tracks upon which the rollers 73 and 74 may operate.

The rollers are mounted on pivots 75 and 76 with axis A—A and shown to be integral with the annular body portion 34ª, the rollers being retained by a screw 77 and washer 78 and screw 77ª and washer 78ª respectively. The compensating member 34 is coupled with collar 71 so as to transmit driving torque thereto, and yet so as to be capable of limited horizontal movement in the direction of axis B—B staggered at right angles to the vertical tracks or slots 32 and 33, that is at right angles to axis A—A.

Figures 10, 11, 12:
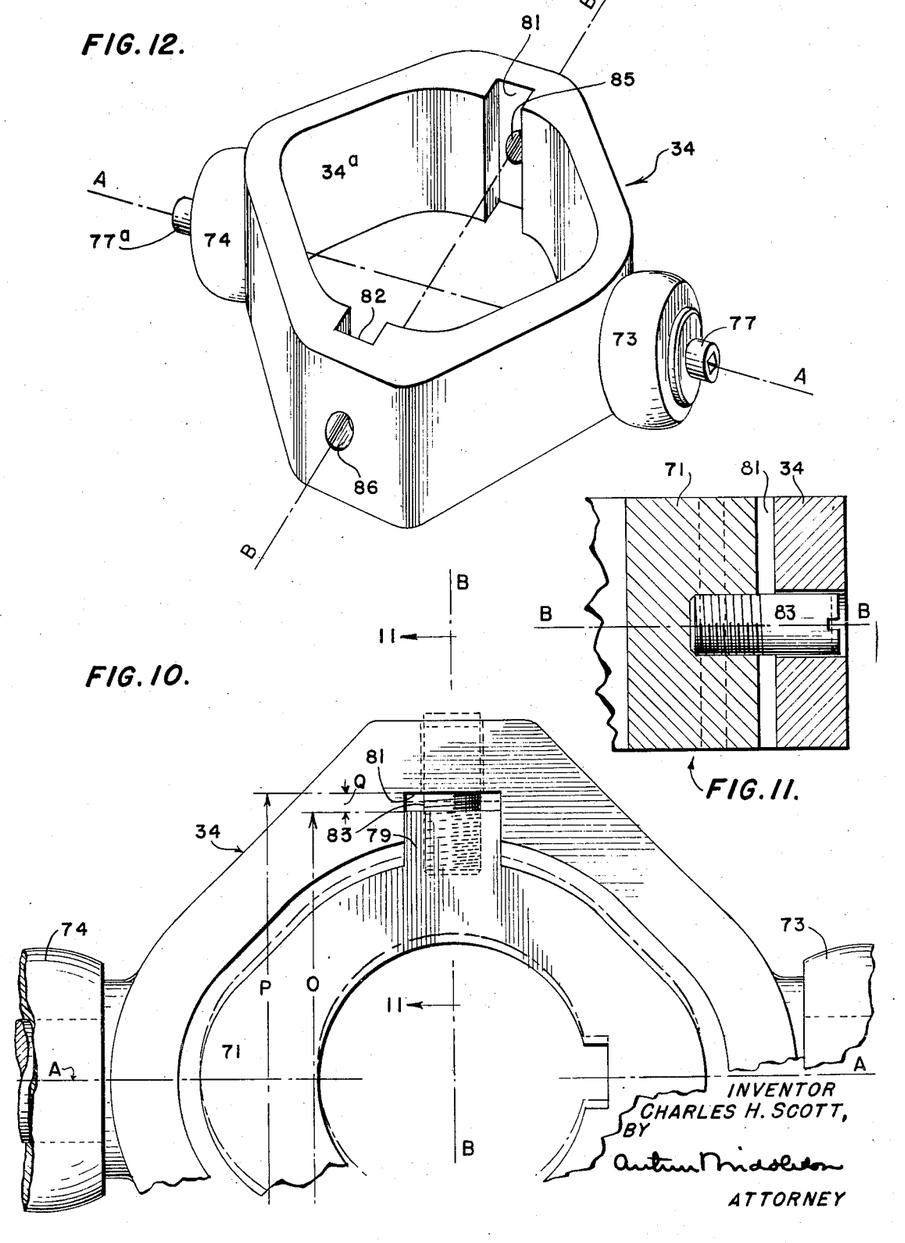
Fig. 10 is a still further enlarged detail top view with parts partially broken away, of the compensating member and associated part, indicating in dot-and-dash lines potential horizontal adjusting movement of the compensating member relative to the associated part.
Fig. 11 is a section along the line 11—11 of Fig. 10.
Fig. 12 is a detached perspective view of the compensating member or ring carrying anti-friction rollers.

To this end the collar 71 is formed with a pair of oppositely arranged vertically extending rib portions 79 and 80 of a suitable cross-section providing lateral vertical extending torque transmitting contact surface, and having sliding fit in correspondingly shaped grooves 81 and 82 (see Fig. 12). It will be noted that the dimension O denoting the horizontal distance between extreme vertical faces of the rib portions 79 and 80 respectively, is smaller than the horizontal distance P between the corresponding vertical faces of the corresponding grooves 81 and 82. The corresponding clearances Q and R thus permit the compensating member 34 to adjust itself in a horizontal direction along the axis B—B relative to the collar 71 which in turn may be considered as a part of the shaft 21. Consequently, irrespective of any inaccuracy in the centering of the shaft 21 relative to the torque tube 30, or any inaccuracy in the vertical guide tracks relative to the associated parts, the compensating ring or coupling member 34 will automatically adjust itself along the axis B—B when the lifting mechanism operates, so as to insure proper and evenly balanced torque transmitting contact between the anti-friction rollers 73 and 74 and their corresponding vertical guide tracks. In the condition shown in Fig. 8 the sense of the torque is assumed to be such that the rollers 73 and 74 have force contact at K and L, but clearance at M and N respectively with the respective vertical tracks as represented by the inner faces of the vertical slots 32 and 33 in the torque tube 30. Axial displacement of the compensating member 34 relative to the collar 31 and the shaft 21 is prevented by a pair of pins 83 and 84 screwed into the collar 71 and having a loose fit in corresponding holes 85 and 86 provided in the compensating member 34 (see Fig. 12). The relative motion between the collar 71 and the compensating member 34 in the direction of axis B—B is further illustrated in the greatly enlarged detail Figures 10 and 11, the dot-and-dash lines indicating a possible shift of the parts relative to one another in a horizontal direction along the line B—B.

It will be noted that the lower end of the torque tube 30 is provided with a flange portion 87 whereby it is bolted to the main drive gear 28. This flange portion 87 has cutouts 89 and 90 to permit the passage therethrough of the pivots 75 and 76 of the compensating member 34 when dismounting or assembling the mechanism. It is also noted that the flange 87 has a specially formed portion 87ª provided with a bore in which is press-fitted a bushing 87ᵇ for guiding the actuating member of switch devices presently to be described.

Figures 5, 6, 7:
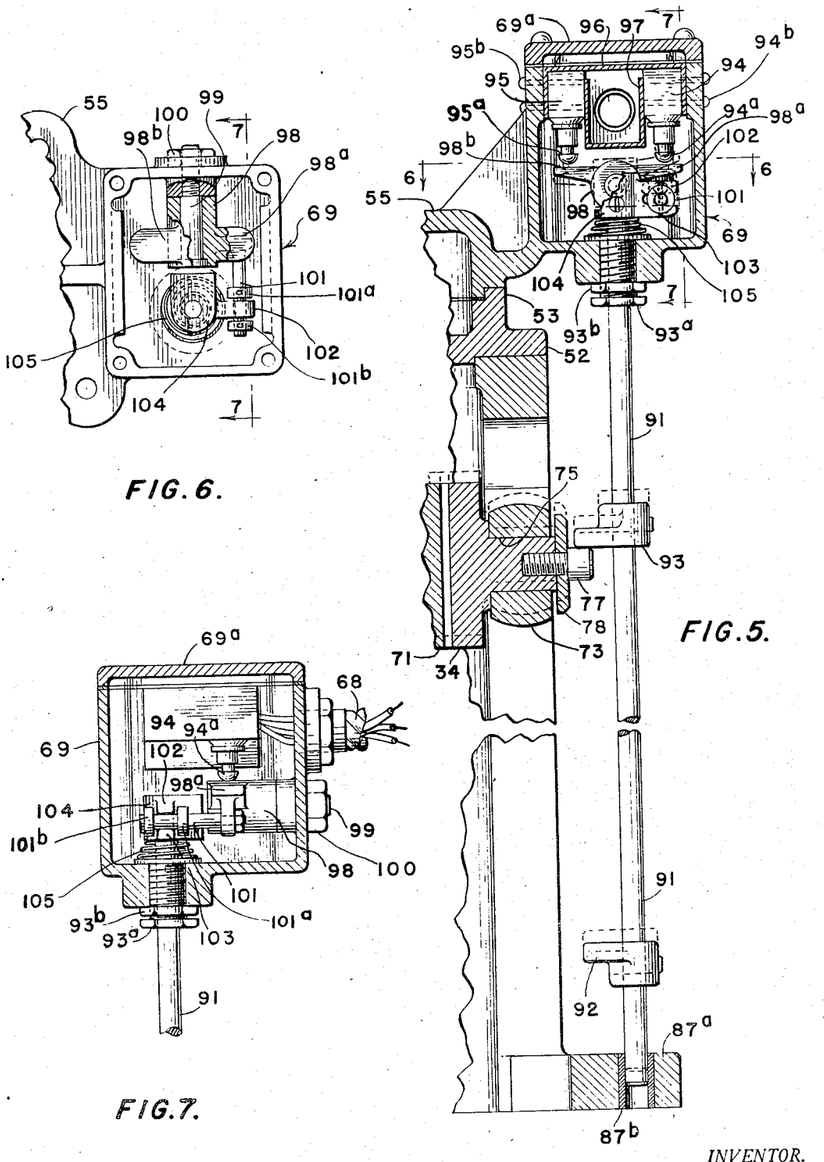
Fig. 5 is an enlarged section of a limit switch arrangement and its associated parts, shown in Fig. 3.
Fig. 6 is a top view upon Fig. 5, with the top cover and the switch units proper removed to show switch actuating parts below.
Fig. 7 is a vertical section along the line 7—7 of Fig. 5, showing in side view actuating parts of the interior of the switch box.
Figure 8:
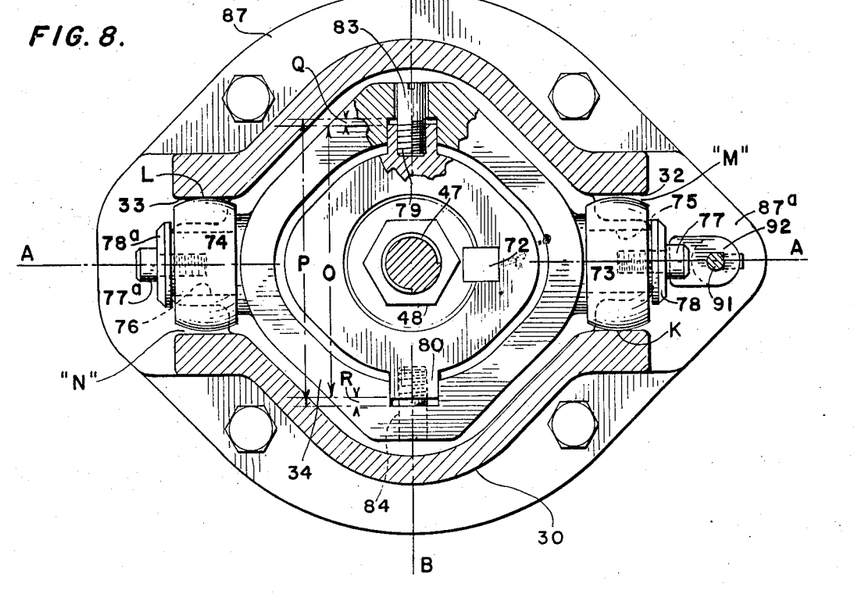
Fig. 8 is a greatly enlarged cross-section taken along the line 8—8 of Fig. 3.
Figure 9:
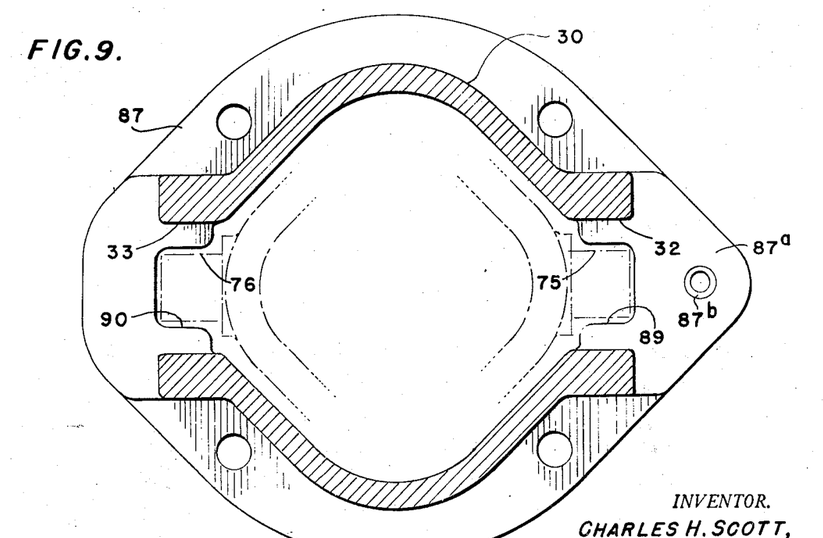
Fig. 9 is a similar cross-section taken along the line 9—9 in Fig. 3.

The retaining screw 77 of roller 73 is utilized to actuate the limit switch mechanism in box 69 to stop the auxiliary motor 56 when the shaft has reached an upper or a lower limit position (see Figs. 5, 6, 7). That is to say, once the motor 56 has been started, as by a starter switch, to lift the shaft 21, the motor will be automatically stopped at the end of its upward movement and vice versa when the shaft 21 is lowered by arbitrarily starting the motor 56, it will be automatically stopped at the end of its downward stroke. The device to do this comprises a vertically shiftable actuating rod or member 91 having thereon a lower adjustable lug or finger or stop member 92 and an upper adjustable lug or finger or stop member 93. The lower end of the rod 91 is guided in the bushing 87ᵇ and the upper end in a bushing 93ª provided in the bottom of box 69. The vertical shifting of the actuating rod 91 may open a switch 94 having an actuating button 94ª operable to stop upward movement of the shaft 21, or it may open a switch 95 having an actuating button 95ª operable to stop the downward movement of the shaft 21.

The switches 94 and 95 are shown to be fastened to the wall of switch box 69 as by screws 94ᵇ and 95ᵇ respectively. There are also shown an insulating plate member 96, and a channel shaped member 97 constituting the receiving and distributing space for the lead-in and lead-out cables 68 and 70 respectively shown in Fig. 4. Inside the box 69 there is further provided a double armed rocker member 98 swingable about a horizontal axis upon a pivot member 99 held fixed upon the wall of box 69 as by means of a lock nut 100. Rocking of the member 98 in the one or the other direction will cause its arms 98ª and 98ᵇ to actuate the switch buttons 94ª and 95ª respectively. The rocker member 98 has fixed thereto a horizontally extending finger 101 the free end of which lodges between the prongs 102 and 103 of a head portion 104 fixed to the extreme upper end of the actuating rod 91. The finger 101 has a fixed collar 101ª and a detachable collar 101ᵇ, which hold confined between them the prongs 102 and 103 of head portion 104, and thereby secure the actuating rod 91 against rotation. A coil spring 105 surrounding the rod 91 is shown to be interposed between the head portion 104 and the bottom of the switch box 69, to compensate for the weight of the rod 91 and restore to neutral the position of the actuating rod 91 once the same is released by the compensating member 34. This restores to neutral the position of the rocker member 98 and effects the release of the one or the other of the switch buttons 94ª and 95ª and the closing of the respective switches 94 or 95, while the axial shifting of the shaft 21 is taking place between its limit positions. The bushing 93ª by reason of being screwed into the bottom of switch box 69, can be adjusted up or down, to adjust the tension of spring 105 to maintain the proper neutral position of the switch actuating rod 91, and locked by lock unit 93ᵇ.

*Operation*

In normally continuous operation of the apparatus, feed liquid, that is liquid containing settleable solids in suspension, enters the settling tank 10 from the feed pipe 17 by way of the feed well 18 the interior of which may be provided with intercepting baffle means for dispersing the impact of the feed liquid into the body of liquid in the tank. The quiescence of the liquid in the tank permits the solids to settle to the bottom while clarified liquid overflowing the circular weir 14 discharges into the launder 13 from which it may be continuously withdrawn. The sediment or sludge resulting from the solids steadily settling to the tank bottom are engaged by the plowing blades 20 of the raking arms 19 revolving with the shaft 21 which in turn is rotated by the drive mechanism 22.

The rotation of the bladed rake arms 19 causes the sediment or sludge to be moved over the tank bottom, keeping it in steady transit towards and into the sump 15 where it is withdrawn through discharge pipe 16 at a suitable regulated rate as by a sludge pump (not shown).

In the normal state of operation, the rake arms 19 and the shaft 21 are in their lowermost position, driven from the motor 45 which imparts driving power by way of pulleys 44 and 42 and belt 43 to the main driving worm 40 which rotates the main driving worm gear 28. The rotation or torque of this worm gear 28 is transmitted to the shaft 21 by way of the upward extension or torque tube or hollow portion 30 of the gear 28, and then through the compensating ring 34, the antifriction rollers 73 and 74 which then lodge in the lower end portion of the vertical slots 32 and 33 respectively provided in the torque tube 30, which ring 34 has self-adjusting coupling connection with the head portion or collar 71 of shaft 21. The fact that the compensating torque transmitting ring 34 can adjust itself in a horizontal direction along the axis B—B (as is well shown in Figs. 8, 10, 11, 12) insures proper torque transmission by balanced force contact from the anti-friction rollers 73 and 74 to the respective vertical faces or tracks represented by the slots 32 and 33. By virtue of such self-adjustment there is imparted to the shaft 21 or rake arms 19 a substantially balanced or true driving torque even though the shaft remain vertically slidable in the main drive gear 28, which means that a balanced or true torque is transmitted even while the shaft 21 is being axially shifted, and that the power required of the auxiliary motor 56 for shifting the shaft 21 is low.

In case the rake arms 19 encounter undue resistance, for instance because of excessive sludge accumulation on the tank bottom whereby they may have become buried in the sludge, an indication of such an overload is given or registered by or from the thrust responsive means 46 responding to excessive axial thrust reaction of the main driving worm 40. Such an indication or warning may be registered at a remote station, advising the operator to set in motion the rake lifting means whereby the overloaded rake arms 19 (even though they may still be rotating) can be raised sufficiently out of the sludge accumulation to be relieved. This can be effected by starting the auxiliary motor 56 to drive the auxiliary worm 54 and worm gear 50 and thus to rotate the operating nut 49 in a direction that will cause the screwing up of the threaded portion or stem 47 and thus the lifting of the shaft 21 and of the rake arms 19. While the anti-friction rollers 73 and 74 move accordingly upward on their respective vertical tracks, the rake arms may remain under load during at least part of their upward movement, yet due to the function of the compensating ring 34 a substantially balanced or true driving torque continues to be transmitted, even while the shaft 21 is axially shifting. The upward movement is automatically stopped at a predetermined point as the switch actuating or abutment portion which is the head of the holding screw 77 (see Fig. 5) engages the upper stop member 93, thereby shifting the switch actuating rod 91 slightly upward and sufficient for it to lift the horizontal finger 101 inside the switch box 68, and accordingly swing the double armed rocker member 98 to its dot-and-dash position, which causes the respective arm 98ᵃ of the rocker member to actuate the corresponding switch button 94ᵃ stopping the auxiliary motor 56, while leaving the rake arms 19 in their raised position, even though the rotation of the rake arms driven by means of motor 45 may continue. Again arbitrarily, the auxiliary motor 56 may be started to run in the opposite direction for lowering the raking means, whenever that be desirable. When such downward movement is initiated, the abutment portion 77 will release the upper stop member 93, permitting the rod 91 to drop and to compress by its weight the cushioning or compensating spring 105, thus returning the rocker member 98 to its neutral position as shown in full lines, thus releasing the switch button 94ᵃ. As the shaft 21 is thus slowly being lowered with the switch mechanism in neutral condition, the continued rotation of the rake arms 19 will work the sludge accumulation towards the central outlet 15 and thus clear the congestion.

When the shaft 21 approaches its predetermined lower limit position, the abutment portion 77 will engage the lower stop member 92 on the switch actuating rod 91, and shift the same downward sufficiently against the pressure of the spring 105, to cause tilting of the rocker member 98 so that the arm 98ᵇ thereof engages switch button 95ᵃ, thus automatically stopping the auxiliary motor 56, and leaving the rake arms 19 to continue to rotate under normal load until another overload condition requires the repetition of the operating cycle just described of the rake lifting means.

Figure 3:
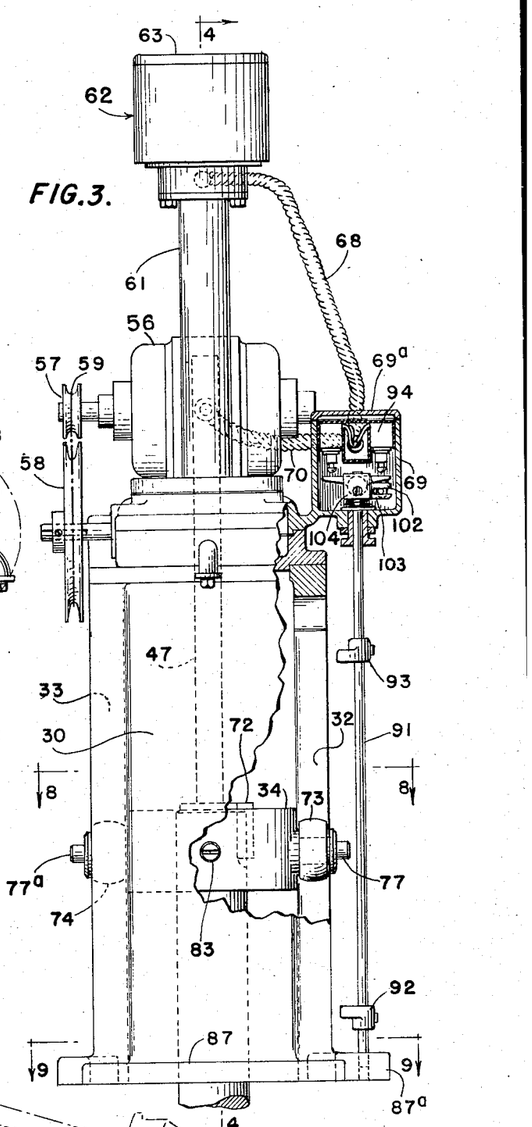
Fig. 3 is an enlarged side view of the lifting mechanism, taken on the line 3—3 in Fig. 1, with parts broken away to expose the novel torque transmitting compensating member.
Figure 4:
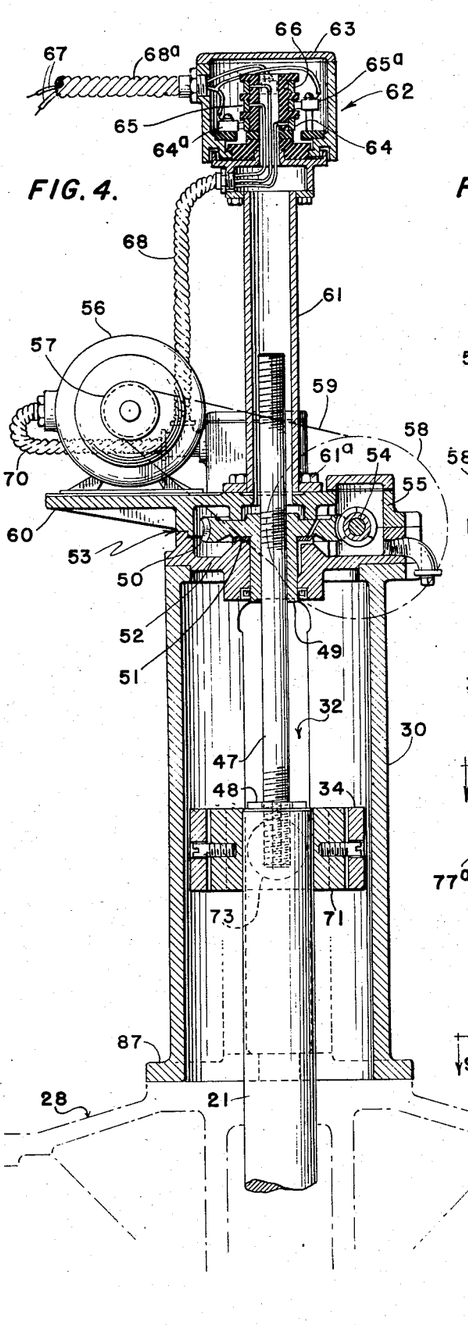
Fig. 4 is a section of the mechanism shown in Fig. 3 taken on the line 4—4, and showing more clearly the construction of the rake lifting mechanism, and also showing a section through the torque transmitting compensating member.

Figs. 1, 3 and 4 illustrate how the novel portion of the mechanism can be operatively interposed between the worm gear 28 and the shaft 21, thereby to permit the ready conversion of a plain sedimentation apparatus (that is one having no rake lifting mechanism) into one provided with the improved rake lifting and torque transmitting means herein described.

To illustrate this feature let us consider that the torque tube 30 together with all parts mounted thereon as well as the threaded stem 47 had been removed from the main driving worm gear 28. Instead of the compensating ring 34, a fixed torque transmitting connection directly between the worm gear 28 and the shaft 21 should be assumed. Such a machine would be operable even though minus the possibility of lifting the raking means, and in case of undue overload the machine would be confined to mere stoppage, even while overload indicating means may be provided. However, the machine may be converted into the improved type by undoing the assumed direct connection between the shaft 21 and the main drive gear 28, and by substituting for that connection the novel parts just mentioned, operatively interposing them between the existing worm gear 28 and an existing shaft 21.

As regards the feature that lies in the provision of what is herein termed the torque balancing means comprising the compensating member 34, it is to be noted that this feature is not to be limited to the use of the anti-friction rollers 73 and 74 provided thereon. For instance, sliding portions or blocks substituted for the rollers would not basically interfere with the self-adjusting function of the compensating member 34.

Figure 13:
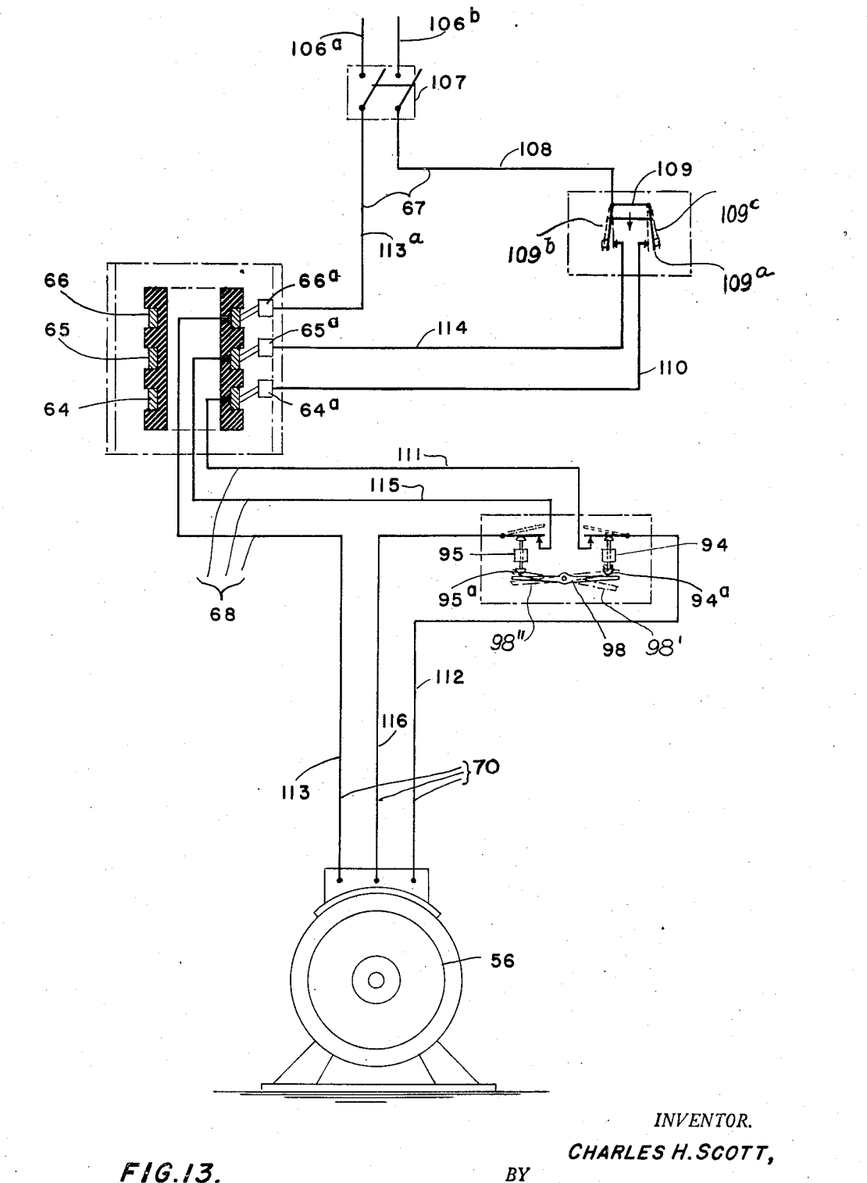
Fig. 13 is a wiring diagram for the auxiliary motor and includes starting- and limit switch devices therefor.

The functioning of the electrical power supply and of the limit switch means during an operating cycle, will be described in further detail by reference to the wiring diagram in Fig. 13:

Power supply lines are shown at 106ª and 106ᵇ leading to a power switch 107 from which a lead-in conductor 108 leads to a double-pole double-throw switch 109 which can be operated optionally to establish one or the other of two circuits having a common return line, whereby the motor 56 can be correspondingly rotated optionally in either the one or the other direction.

One such optional circuit leads over a conductor 110, the brush 64ª and slip ring 64, a conductor 111, the limit switch 94, a conductor 112, to the motor 56, thence through a common conductor 13, over the slip ring 66, the brush 66ª, and a conductor 113ª, back to the power switch 107.

The other optional circuit leads from the lead-in conductor 108 over the switch 109, a conductor 114, the brush 65ª, the slip ring 65, a conductor 115, the limit switch 95 and a conductor 116, to the motor 56, thence back through the common return line, that is through the conductor 113, the slip ring 66, the brush 66ª, and the conductor 113ª, to the power switch 107.

Let it be assumed that the power switch 107 is closed and that the double-pole switch 109 is in neutral position (that is the full line position designated as 109ª thereof). When the overload responsive device 46 associated with the main drive mechanism (main drive worm 40) indicates to the operator that an overload exists on the sediment-engaging arms 19, he will throw the switch 109 from the neutral position 109ª to the position shown in dotted lines and designated as 109b. At this time the limit switch 94 is normally closed, and the limit switch 95 open, since the lower stop member 92 is being held engaged by the vertical member or shaft 21, thus holding the rocker arm 98 tilted to its dot-and-dash line position designated as 98', thereby holding open the limit switch 95.

This initiates the lifting of the vertical member 21 and of the rake arms 19 and keeps it up until the upper stop member 93 is engaged by vertical member 21 to open the limit switch 94 by tilting the rocker member 98 to the dotted line position designated as 98''. Thus the motor 56 stops, leaving the rake arms 19 in their raised or upper limit position, even though the rake arms may continue to be rotated due to the continued function of the main drive mechanism driven by the motor 45. It will be understood, however, that at the beginning of this upward movement of the vertical member or shaft 21, the lower stop member 92 has been released, permitting the limit switch 95 to close, and thus it will also be understood that during the upward movement of the shaft 21 both limit switches 94 and 95 remain closed inasmuch as the rocker member 98 is then temporarily placed in neutral position. That is to say, while neither the lower stop member 92 nor the upper stop member 93 is engaged, the switch actuating rod 91 will adjust itself and thereby the rocker member 98 to neutral position due to the balancing effect of the spring 105.

If the operator now desires to lower the vertical shaft 21 and the rake arms 19, he will throw the switch 109 from its 109b position to its 109c position shown in dot-dash lines. This will start the motor 56 rotating in the opposite direction, and will thus cause the vertical member 21 and the rake arms 19 to be lowered until the lower stop member 92 is again engaged by the vertical member 21, forcing the rocker arm 98 from neutral into its dot-dash line position 98' and thereby opening the limit switch 95, thus stopping the motor 56.

Thus the rake arms 19 are again in their lowermost or lower limit position in which they normally operate with respect to the bottom of the tank. It will be understood that throughout the operating cycle of the lifting mechanism, that is the cycle which includes the raising and the lowering of the sediment engaging means, the main drive mechanism through motor 45 and thus the rotation of rake arms 19 may continue to function without any interruption.

I claim:

1. In sedimentation apparatus having a settling tank, a vertical rotary shaft member provided with sediment engaging means, and stationary supporting structure having fixed relation to said tank, for operatively supporting therefrom said vertical rotary shaft member and said sediment raking means, a drive mechanism comprising a rotary main drive shaft member coaxial with said vertical member, drive means for said main drive shaft member, said vertical member being axially shiftable in said main drive member, a pair of oppositely arranged vertical torque transmitting guide tracks rising from and unitary with said main drive member and disposed symmetrically with respect to said vertical shaft member, a torque transmitting compensating member loosely surrounding the upper end portion of said vertical shaft member, torque transmitting coupling means between the vertical shaft member and the surrounding compensating member effective to cause the compensating member to be moved bodily up or down with said vertical shaft member and also effective to allow a limited bodily movement of the compensating member relative to the vertical shaft member in a predetermined horizontal direction, oppositely and outwardly disposed torque transmitting portions provided on said compensating member with each portion engageable by one of said vertical tracks to rotate the vertical shaft member when the main drive member is rotated, said compensating member also having transverse play with respect to the tracks at right angles to the direction of play in the coupling means, the combined effect of the horizontal plays of the compensating member allowing for self adjustment of the compensating member relative to the vertical shaft member as well as relative to the guide tracks due to inaccuracies of concentricity whereby substantially equal and inter-balanced shares of driving torque are imposed upon each track from said main drive member to said vertical member, and auxiliary means associated with said torque transmitting guide tracks for lifting or lowering said vertical shaft member and said sediment engaging means.

2. Apparatus according to claim 1, in which said rotary main drive member has a hollow vertical upward extension embodying said guide tracks.

3. Apparatus according to claim 1, in which each of said track engaging portions of said compensating member comprises an anti-friction roller engaging the respective guide track.

4. Apparatus according to claim 1, in which said compensating member has an annular body portion provided interiorly with a pair of vertical grooves oppositely arranged and staggered at right angles to said oppositely arranged pair of torque transmitting track engaged portion, a pair of oppositely arranged projections on said vertical member, substantially conforming to and having said vertical grooves and having clearances therewith adapted to permit limited horizontal relative movement between said compensating member and the vertical member in a direction at right angles to said vertical tracks, and aligning means effective between the vertical shaft member and the compensating member for preventing any substantial vertical relative displacement between them.

5. Apparatus according to claim 1, in which said rotary main drive member has a vertical rising hollow extension embodying said guide tracks, and in which said auxiliary means comprise a threaded stem coaxial with said vertical member and extending upwardly therefrom, an operating nut engaging said threaded stem, and mounted for rotation and axially non-shiftable in the upper end of said vertical extension, drive means including an auxiliary motor mounted on said vertical extension and unitary therewith, and sliding contact means for supplying power to said auxiliary motor.

6. Apparatus according to claim 1, in which said auxiliary means comprise a threaded stem coaxial with said vertical member and extending upwardly therefrom and screwed into the top end of said vertical member, in which said compensating member has an annular body portion provided interiorly with a pair of vertical grooves oppositely arranged and staggered at right angles to said oppositely arranged pair of track engaging portions, each groove being provided with a horizontally extending bore to receive an aligning pivot such as hereinafter defined, with the addition of a collar portion fixed to the upper end portion of said vertical member and surrounded by said annular portion, and provided with oppositely arranged projections substantially conforming to and having torque transmitting engagement with said vertical grooves, and having clearances therewith to permit limited substantially horizontal relative movement between said compensating member and said vertical member in a direction at right angles to said vertical tracks, and an aligning pivot unitary with each projection, each pivot extending horizontally and into one of said respective bores, each aligning pivot having a threaded portion whereby it is screwed into the associated projection.

7. In sedimentation apparatus having a tank, a vertical rotary shaft member provided with sediment engaging means, stationary structure for operatively supporting therefrom said vertical shaft member and said sediment engaging means, a drive mechanism comprising a driven main drive member rotatable about a vertical axis, power drive means for said main drive member, said vertical member being axially shiftable in said main drive member, a torque transmitting hollow extension rising from said main drive member and surrounding the upper end portion of said vertical member and provided with vertical guide track means, track engaging means connected with said vertical member through which torque is transmitted from said hollow shaft member to said vertical member, a threaded portion provided at the upper end of said vertical member, an operating nut engaging said threaded portion and mounted for rotation on and axially non-shiftable with respect to said hollow extension for lifting or lowering said vertical shaft member, an auxiliary motor unitary with said hollow extension, drive transmitting means between said auxiliary motor and said operating nut, a stationary power supply for said auxiliary motor, and slip contact means between the power supply and said auxiliary motor comprising a stationary portion and a revolving portion unitary with said hollow extension.

8. Apparatus according to claim 7, in which said hollow extension comprises a body portion having an open upper end, and a closing portion for said end, which closing portion comprises a casing having mounted in the bottom portion thereof said operating nut and also having enclosed therein a portion of said drive transmitting means for the operating nut.

9. Apparatus according to claim 7, in which the torque transmitting hollow extension comprises a body portion having an open upper end, a closing portion for said upper end comprising a horizontally split casing the lower half portion of which has mounted therein said operating nut, said drive transmitting means comprising a worm gear unitary with said nut and a worm driving the worm gear with said worm gear and said worm being disposed in said casing.

10. Apparatus according to claim 7, in which the torque transmitting hollow extension comprises a body portion having an open upper end, a closing portion for said upper end comprising a horizontally split casing the lower half portion of which has mounted thereon said operating nut, said drive transmitting means comprising a worm gear unitary with said nut and a worm driving the worm gear with said worm gear and said worm being disposed in said casing, and the upper half portion of said casing having unitary therewith a bracket portion for supporting said auxiliary motor.

11. Apparatus according to claim 7, with the addition of limit switch means for said auxiliary motor, comprising a switch housing fixedly associated with the upper end portion of said hollow extension, a vertical axially shiftable switch actuating rod extending downwardly from said switch housing, guide means for the lower end of the rod, an upper and a lower stop member vertically adjustable on said rod, switch actuating means connected with the upper end portion of the vertical shaft member and disposed between said stop members and effective to engage said upper or said lower stop member respectively at the end of its upward or downward movement and thereby to shift said switch actuating rod, and switch means in said switch housing, said switch rod incident to its upward or downward movement being effective to stop the motor and thereby axial movement of said vertical shaft member.

12. As an attachment for sedimentation apparatus having a vertical rotary shaft provided with sediment engaging means, a main drive gear coaxial with said vertical shaft in which said shaft is axially shiftable, and having drive means for said main drive gear, the combination comprising a torque transmitting hollow body portion rising from and attachable to said main drive gear while surrounding the upper end portion of said vertical shaft and provided with vertical guide track means, track engaging means connected with said vertical shaft through which torque is transmitted from said hollow body portion to said vertical shaft, a threaded portion and means for connecting the same coaxially with the upper end portion of said vertical shaft, an operating nut engaging said threaded portion and mounted for rotation on but axially non-shiftable with respect to said hollow portion, said nut being rotatable for lifting or lowering said vertical shaft, an auxiliary motor unitary with said hollow portion, drive transmitting means between said auxiliary motor and said operating nut, a stationary power supply for said auxiliary motor, and slip contact means between the power supply and the auxiliary motor comprising a stationary portion and a revolving portion unitary with said hollow portion.

13. An attachment according to claim 12, in which the track means comprise a pair of oppositely disposed tracks, and the track-engaging means comprise a compensating member having a pair of oppositely arranged portions engaging said tracks, and means for coupling said compensating member with said vertical shaft in a manner to permit self adjusting movement of the member in a horizontal direction staggered at right angles with respect to said tracks.

CHARLES H. SCOTT.